United States Patent [19]

Kawahara

[11] Patent Number: 4,928,095
[45] Date of Patent: May 22, 1990

[54] ACTIVE MATRIX-ADDRESSED PICTURE DISPLAY DEVICE

[75] Inventor: Yukito Kawahara, Tokyo, Japan

[73] Assignee: Seiko Instruments Inc., Japan

[21] Appl. No.: 562,079

[22] Filed: Dec. 16, 1983

[30] Foreign Application Priority Data

Dec. 23, 1982 [JP] Japan .................. 57-228184

[51] Int. Cl.$^5$ .............................................. G09G 3/36
[52] U.S. Cl. ..................................... 340/784; 340/719
[58] Field of Search ............... 340/718, 719, 765, 784; 350/333

[56] References Cited

U.S. PATENT DOCUMENTS

| | | | |
|---|---|---|---|
| 4,006,383 | 1/1977 | Luo et al. | 340/718 |
| 4,386,352 | 5/1983 | Nonomura et al. | 340/719 |
| 4,429,305 | 1/1984 | Hosokawa et al. | 340/719 |
| 4,431,271 | 2/1984 | Okubo | 340/784 |

OTHER PUBLICATIONS

Brody, T. P. et al., "A 6×6 Inch 20 Lines-Per-Inch Liquid Crystal Display Panel", IEEE Transactions on Electron Devices, Nov. 1973, vol. ED-20, No. 11, pp. 995-1001.

*Primary Examiner*—Jeffery A. Brier
*Attorney, Agent, or Firm*—Bruce L. Adams; Van C. Wilks

[57] ABSTRACT

An active matrix-addressed picture display device comprises a matrix of picture elements arranged in a row-by-column matrix, each picture element comprising a liquid crystal cell, a single capacitor for holding a signal voltage to be applied to the liquid crystal cell, and a single switching transistor for enabling a signal voltage to be applied to the capacitor. Column signal supply electrodes are connected to apply signal voltages to the columns of switching transistors, and row address electrodes are connected to apply scanning voltages to the rows of switching transistors. To eliminate shorting between the substrate and the column and row electrodes, one side of the capacitors in each row of picture elements are connected to a preceding row address electrode of a neighboring row of picture elements.

4 Claims, 4 Drawing Sheets

ACTIVE MATRIX-ADDRESSED PICTURE DISPLAY DEVICE

BACKGROUND OF THE INVENTION

This invention relates to a picture display device comprising switching elements arranged in an active matrix-addressed panel.

A conventional active matrix-addressed panel comprises picture elements each consisting of a transistor $T_{ij}$ for writing a signal voltage, a capacitor $C_{ij}$ for holding the signal, and a liquid crystal cell $LC_{ij}$ as shown in FIG. 1. One electrode of the capacitor $C_{ij}$ is connected to a drain of the transistor and the other electrode of the capacitor $C_{ij}$ is connected to a substrate. For connecting one of the electrodes of the capacitors of all the picture elements to the substrate, an electrode for applying the electric potential of the substrate to one of the capacitor electrodes is required One problem encountered when using such connecting electrodes is that they are likely to cause an electrical short between a signal supply electrode $S_j$ and the substrate and a short between an address electrode $G_i$ and the substrate produced by troubles in the panel manufacturing process. The shorts are present as line defects on the display picture surface, which is a fatal defect as a display device and causes the manufacturing yield of the panel to be lowered.

BRIEF SUMMARY OF INVENTION

It is an object of the invention to provide an improved picture display device.

It is another object of the invention to eliminate formation of a short between the substrate and the signal supply electrode or a short between the substrate and the address electrode.

It is another object of the invention to reduce line defects on the display picture.

It is another object of the invention to increase the manufacturing yield of an active matrix-addressed panel.

DESCRIPTION OF THE PREFERRED EMBODIMENTS

Figure 1:
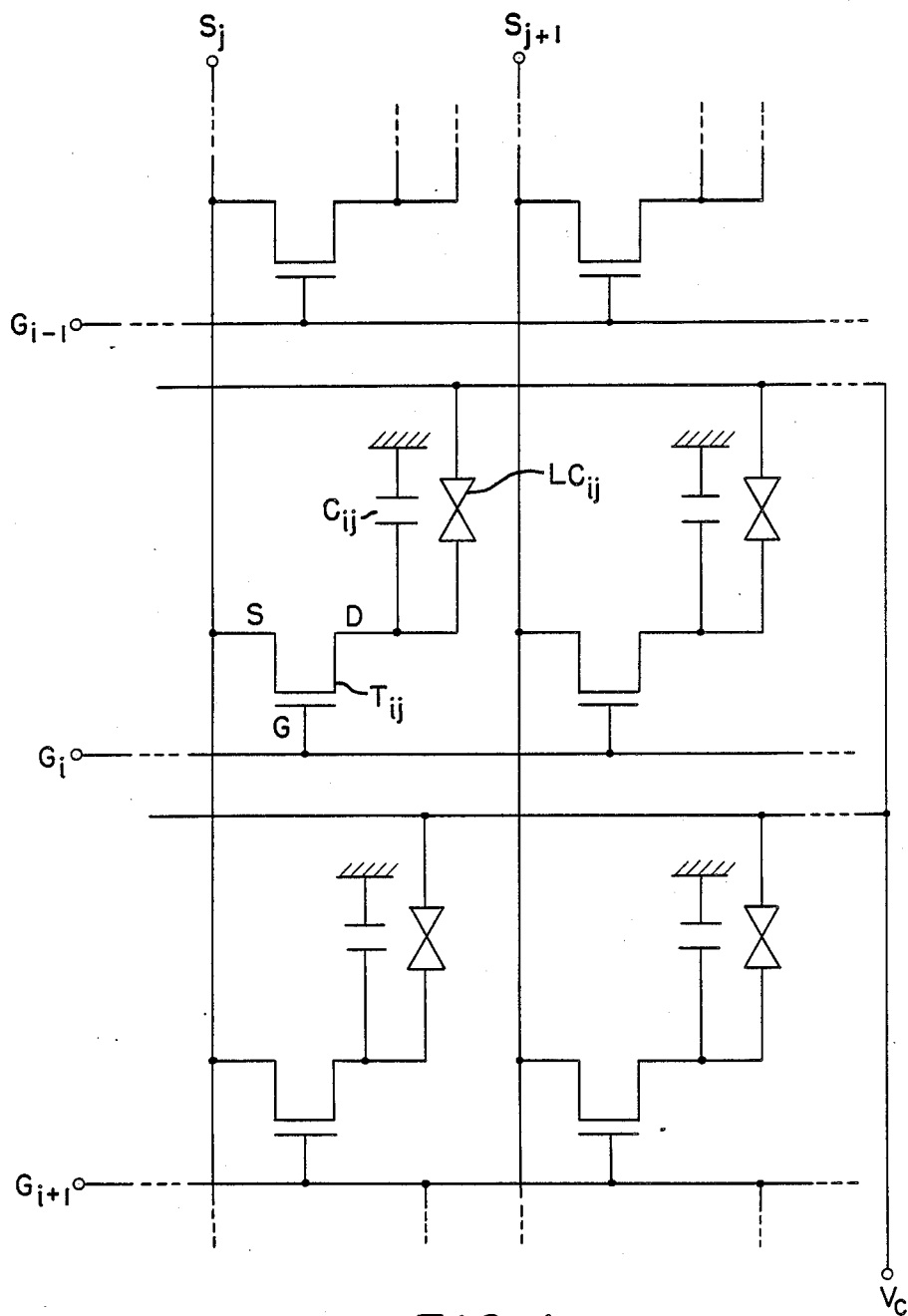
FIG. 1 is an equivalent circuit diagram of a conventional active matrix-addressed panel.
Figure 2:
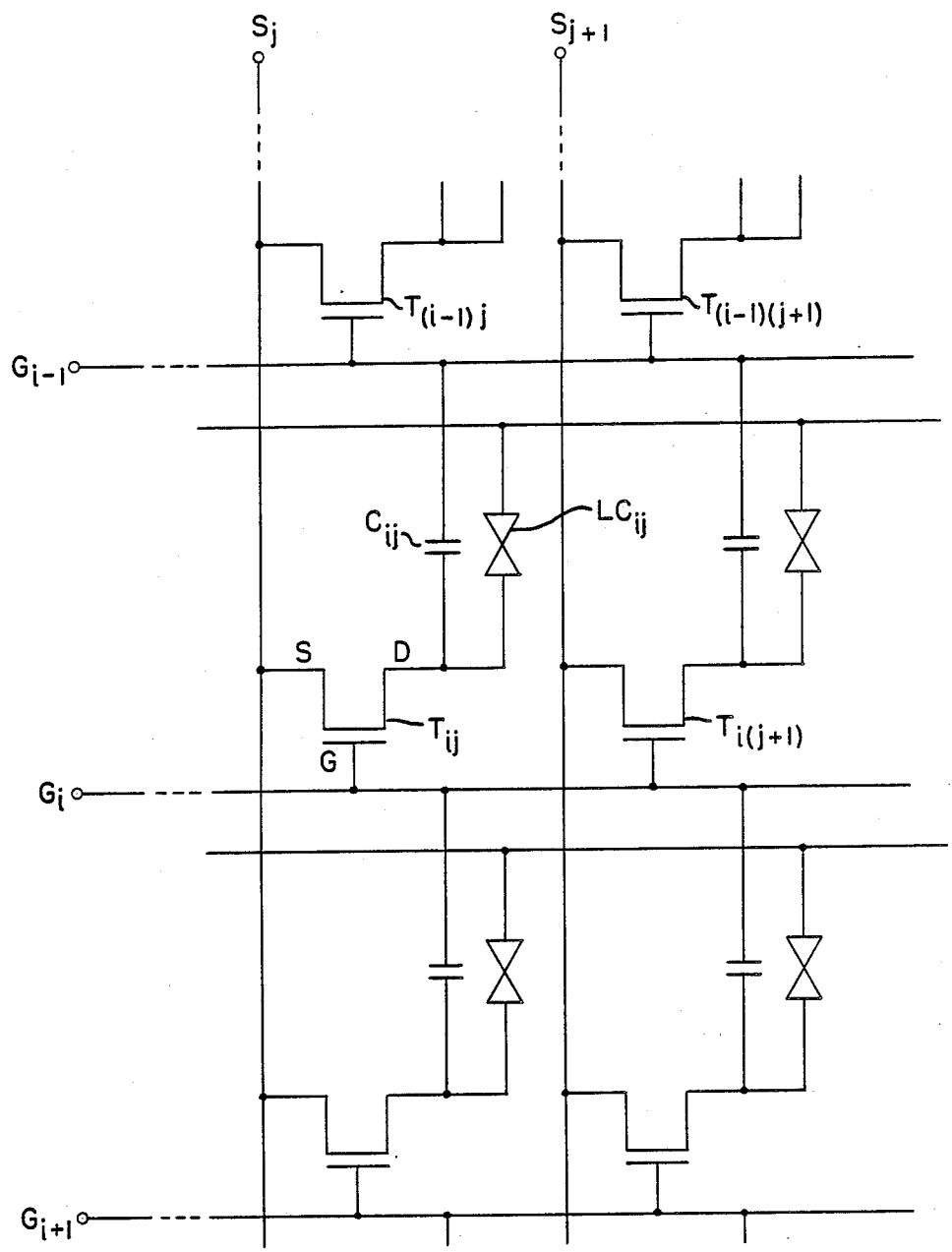
FIG. 2 is an equivalent circuit diagram of an active matrix-addressed panel showing an embodiment of the present invention.

FIG. 2 is an equivalent circuit diagram showing the construction of an active matrix-addressed panel according to one embodiment of the present invention. A unit picture element at i row and j column consists of a transistor $T_{ij}$ for writing a picture signal, a liquid crystal cell $LC_{ij}$ and a capacitor $C_{ij}$ for holding a signal voltage. One electrode of the capacitor $C_{ij}$ is connected to a drain of the transistor $T_{ij}$ and the other electrode is connected to an address electrode $G_{i-1}$ which addresses a picture element at the preceding row. The transistor $T_{ij}$ is placed in the ON state by a gate voltage $V_{ON}$ and placed in the OFF state by a gate voltage $V_{OFF}$. Generally, an active matrix-addressed panel is driven by the steps of: applying the voltage $V_{ON}$ to an address electrode $G_i$ (i=1 ... m); meanwhile writing a picture signal with a transistor $T_{ij}$ (j=1 ... n) which uses the electrode $G_i$ as a gate; applying the voltage $V_{OFF}$ to the electrode $G_i$; simultaneously applying the voltage $V_{ON}$ to an address electrode $G_{i+1}$ at the succeeding row; and writing a new picture signal with a transistor $T_{(i+1)j}$. By repeating the above operation, picture signals are written in all the picture elements.

When the electric potential of the address electrode $G_{i-1}$ changes from $V_{ON}$ to $V_{OFF}$, a voltage to be applied to the succeeding address electrode $G_i$ changes from $V_{OFF}$ to $V_{ON}$ simultaneously, and the transistor $T_{ij}$ belonging to the i row becomes in the ON state. Then a new picture signal is held in the capacitor $C_{ij}$ (j=1 ... n) via the transistor $T_{ij}$ from a signal supply electrode $S_j$. Since one electrode of the capacitor $C_{ij}$ is connected to the address electrode $G_{i-1}$ at the preceding row, the electric potential of the address electrodes are fixed to $V_{OFF}$ at the ratio of about ((m−1)/m) per 1 frame period, where m indicates the number of the address electrodes. Even if the number of the address electrodes is large, the written signal voltage applied across the liquid crystal cell hardly shifts but is held almost as it is. Accordingly, even if one electrode of the capacitor is not connected to the substrate but connected to the address electrode at the preceding rows, the picture is displayed without defect.

By the above-noted construction, a substrate electrode is not provided on the panel surface. As a result, there can be no short between the substrate and the signal supply electrode nor between the substrate and the address electrode, and consequently no line defects appear on the picture such as surface have conventionally occurred by such shorts.

Figure 3:
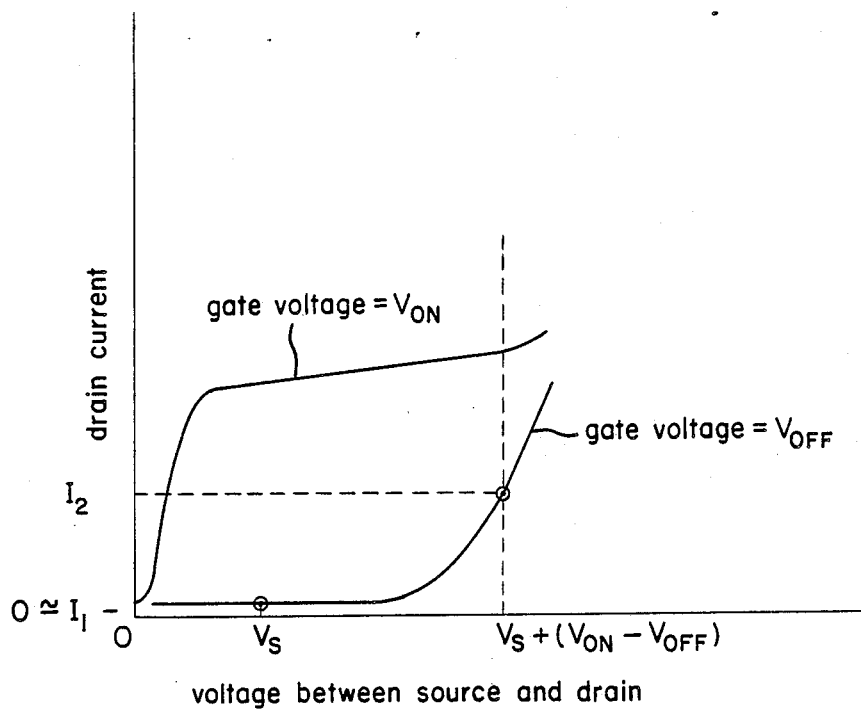
FIG. 3 is a voltage/current characteristic diagram of a thin-film transistor with inferior characteristics.

In case a thin-film transistor, which can be formed on an insulating substrate, is used for the transistor $T_{ij}$, it is indispensable that one electrode of the capacitor $C_{ij}$ be connected to the address electrode at the preceding row to attain an excellent picture. Generally the characteristic of a thin-film transistor depends more on the manufacturing process than that of a semiconductor element using an ordinary single crystal Si. A transistor having inferior characteristics exhibits the voltage-current characteristics as shown FIG. 3. FIG. 3 shows that a large drain current flows as a leak current if a voltage between the source and the drain is high even if the gate voltage is $V_{OFF}$.

Figure 4:
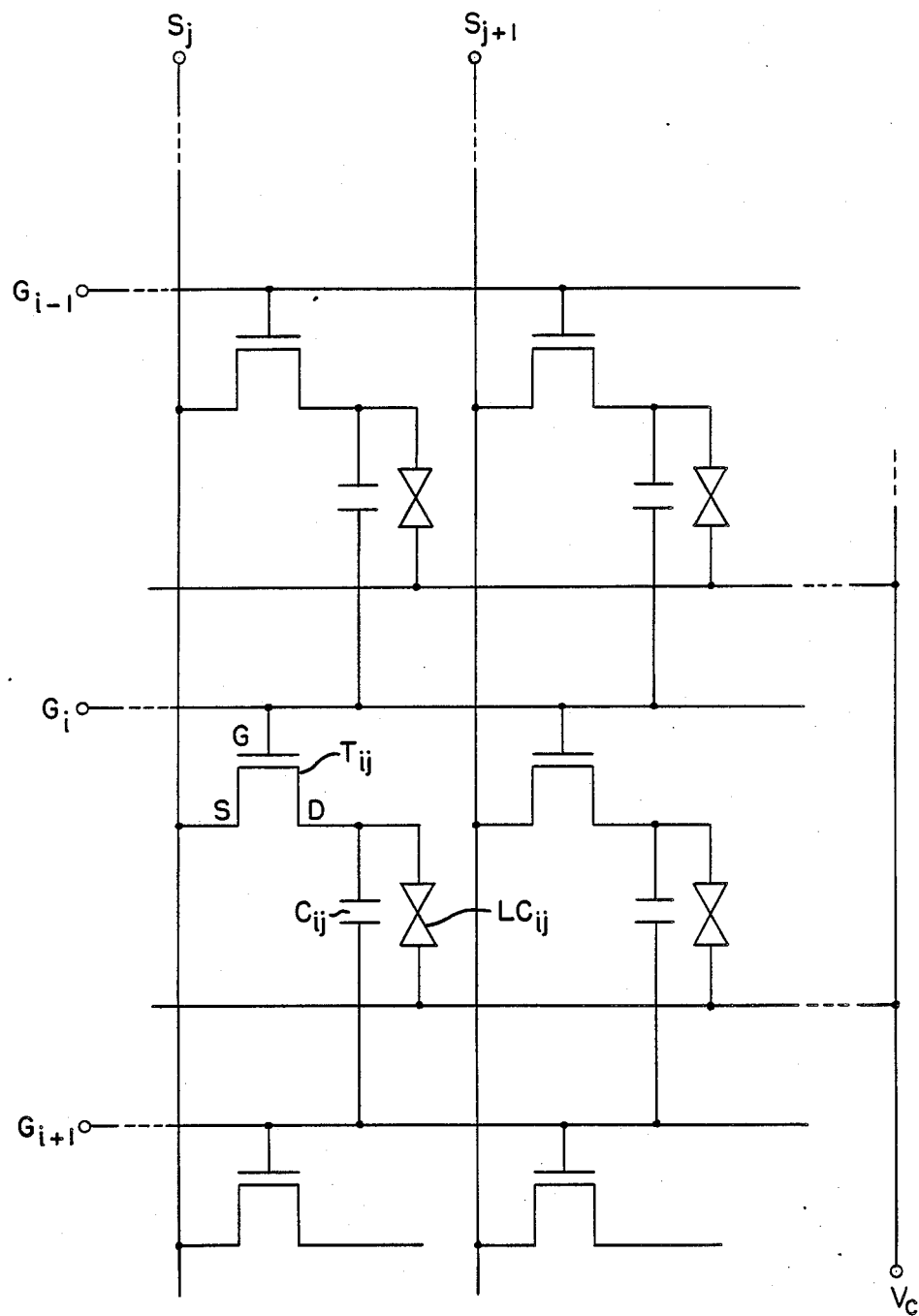
FIG. 4 is an equivalent circuit diagram of an active matrix-addressed panel showing another embodiment of the present invention.

FIG. 4 shows another embodiment of the present invention, in which a capacitor $C_{ij}$ is connected to an address electrode $G_{i+1}$ at the succeeding row (as opposed to an address electrode at a preceding row as in the case of FIG. 2). A voltage $V_{ON}$ is applied to the address electrode $G_i$ and a signal voltage $V_s$ is held in the capacitor $C_{ij}$. At this time the electric potential of the address electrode $G_{i+1}$ is $V_{OFF}$. Then the electric potential of the address electrode $G_i$ changes from $V_{ON}$ to $V_{OFF}$, and the voltage $V_{ON}$ is applied to the address electric potential $G_{i+1}$ at the succeeding row. Assuming that the transistor $T_{ij}$ shows the characteristics as shown in FIG. 3 because of its dispersion, the voltage at a drain D of the transistor $T_{ij}$ changes from $V_s$ to $V_s+(V_{ON}-V_{OFF})$ when the electric potential of the address electrode $G_{i+1}$ changes from $V_{OFF}$ to $V_{ON}$. As a result even if $V_{OFF}$ is supplied to the address electrode $G_i$, a large drain current $I_2$ flows when the electric potential of the signal supply electrode $S_j$ is 0. In this manner, when $V_{OFF}$ is applied to the address electrode $G_{i+1}$ again, a voltage lower than the initially written signal voltage $V_s$ is held in the capacitor $C_{ij}$. Accordingly, an electric potential different from the written electric potential $V_s$ is applied to the liquid crystal at the ratio of about $(1-1/m)$ during 1 frame period, and thereby the dispersion in characteristics of the transistors appears on the panel as a disorder of the picture. However, this problem can be solved by connecting one electrode of the capacitor $C_{ij}$ to the address electrode $G_{i-1}$ at the preceding row rather than at the succeeding row as shown in FIG. 2. Because, although a voltage held between both electrodes of the capacitor $C_{ij}$ changes in accordance with the change in the electric potential of the address electrode $G_{i-1}$ from $V_{OFF}$ to $V_{ON}$, the voltage $V_{ON}$ is applied to the address electrode $G_i$ at the succeeding row when the electric potential of the address electrode $G_{i-1}$ changes from $V_{ON}$ to $V_{OFF}$ again, whereby the transistor $T_{ij}$ is turned ON and a new signal voltage is held in the capacitor $C_{ij}$. Accordingly, the predetermined written signal voltage $V_s$ largely changes at the time ratio of about 1/m per 1 frame period. Since the number m of the address electrodes in the active matrix-addressed panel is generally no more than around 200, a change in shading of the picture produced by a shift of the voltage from the predetermined signal voltage $V_s$ is virtually nondistinctive or imperceptible on the displayed picture.

As illustrated, the line defects caused by troubles in manufacturing process which exist in a conventional active matrix-addressed panel can be largely reduced by the present invention, and moreover, disorder of the picture caused by dispersion in the characteristics of the transistors provided in the panel can be eliminated.

What is claimed is:

1. An active matrix-addressed picture display device comprising: m row address electrodes which are scanned in one direction during use of the device; n column signal supply electrodes; and a plurality of picture elements arranged in m rows and n columns, each picture element comprising a liquid cyrstal cell, a switching transistor having a gate electrode connected to one row address electrode, a source electrode connected to one column signal supply electrode and a drain electrode connected to the liquid crystal cell, and a single capacitor one side of which is connected to the drain electrode of said switching transistor and the other side of which is connected to a preceding row address electrode preceding the picture element of which the capacitor forms a part in the scanning direction.

2. An active matrix-addressed picture display device comprising: a matrix of picture elements arranged in a row-by-column matrix, each picture element comprising a liquid crystal cell, a single capacitor for holding a signal voltage to be applied to the liquid crystal cell, the single capacitor having a pair of terminals, one terminal being connected to the liquid crystal cell, and a switching transistor for enabling a signal voltage to be applied to the capacitor, the switching transistor having a gate electrode, a first electrode, and a second electrode connected to said one terminal of the capacitor; column signal supply electrodes connected to apply signal voltages to the first electrodes of the columns of switching transistors; row address electrodes scanned in one direction and connected to apply scanning voltages to the gate electrodes of the rows of switching transistors; and means connecting the other terminals of the capacitors in each row of picture elements to a preceding row address electrode of a neighboring row of picture elements which precedes said each row of picture elements on the scanning direction.

3. An active matrix-addressed picture display device according to claim 2; wherein the neighboring row of picture elements comprises an immediately preceding row of picture elements.

4. An active matrix-addressed picture display device according to claim 2 wherein the switching transistors comprise thin-film transistors.

* * * * *